United States Patent [19]
Cho

[11] Patent Number: 6,010,111
[45] Date of Patent: Jan. 4, 2000

[54] SWIVELING DEVICE FOR LIQUID CRYSTAL DISPLAY MONITOR

[75] Inventor: Chang Ho Cho, Inchon, Rep. of Korea

[73] Assignee: SamSung Electronics Co., Ltd., Suwon, Rep. of Korea

[21] Appl. No.: 08/958,705

[22] Filed: Oct. 17, 1997

[30] Foreign Application Priority Data

Nov. 15, 1996 [KR] Rep. of Korea ................. U-96-40391

[51] Int. Cl.[7] ........................ A47B 91/00; A47B 95/00
[52] U.S. Cl. ................ 248/923; 248/346.06; 248/349.1
[58] Field of Search ................ 248/349.1, 371, 248/917, 918, 919, 921, 922, 923, 346.03, 346.06; 403/348, 350, 409.1

[56] References Cited

U.S. PATENT DOCUMENTS

| | | |
|---|---|---|
| 4,365,779 | 12/1982 | Bates et al. ........................... 248/371 |
| 4,547,027 | 10/1985 | Scheinbenreif ........................ 248/921 |
| 4,589,713 | 5/1986 | Pfuhl et al. ........................ 248/349.1 |
| 4,762,378 | 8/1988 | Kagami ................................. 248/923 |
| 4,781,347 | 11/1988 | Dickie ................................. 248/183 |
| 4,834,329 | 5/1989 | Delapp ................................. 248/923 |
| 5,024,415 | 6/1991 | Purens ................................. 248/371 |
| 5,588,625 | 12/1996 | Beak ................................... 248/371 |
| 5,626,435 | 5/1997 | Wohlhuter ............................ 403/348 |
| 5,632,463 | 5/1997 | Sung et al. .......................... 248/371 |
| 5,701,347 | 12/1997 | Daniels et al. ........................ 381/24 |

Primary Examiner—Derek J. Berger
Assistant Examiner—Michael D. Nornberg
Attorney, Agent, or Firm—Robert E. Bushnell, Esq.

[57] ABSTRACT

A swiveling device that can be used in a stand supporting LCD monitors is disclosed. The swiveling device uses combinations of flanges and ribs to prevent the concentration of eccentric load forces on central connectors. This increases the reliability and the corresponding market competitiveness of monitors using this swiveling device as well as preventing the inefficiencies created by monitor failure in the work place.

14 Claims, 5 Drawing Sheets

SWIVELING DEVICE FOR LIQUID CRYSTAL DISPLAY MONITOR

CLAIM OF PRIORITY

This application makes reference to, incorporates the same herein, and claims all rights acciruing thereto under 35 U.S.C. § 119 through my patent application entitled Swiveling Device for Liquid Crystal Display Monitor earlier filed in the Korean Industrial Property Office on the 15th day of Nov. 1996 and there duly assigned Serial No. 1996/40391.

BACKGROUND OF THE INVENTION

1. Field of the Invention

The present invention relates to monitor stands and, more specifically, to a swiveling stand for a liquid crystal display monitor capable of effectively distributing the weight of the LCD and preventing excessive wear of the wing type connecting components.

2. Background Art

With the increasing amounts of information that are managed and displayed using computers, the development of higher quality monitors has been an area of extensive research. This research has led to improvements in the miniaturization of internal components, in the reduction of monitor thickness, and in the quality of picture displayable by a monitor. Today, older monitors, such as the heavy and bulky CRT monitors (Cathode Ray Tub monitors), are being replaced with compact LCD monitors (Liquid Crystal Display monitors) that are designed using a combination of LCD and semiconductor techniques.

A LCD monitor may be constructed using: a LCD display unit, a stand unit, and a stand-display interface. The LCD display unit's front and rear housings are assembled into a single housing containing both a LCD and a PCB (Printed Circuit Board). The stand unit supports the display unit on a support surface and includes a plurality of connectors for power and signal cables.

The swiveling devices used for LCD monitors may be constructed with a recess that is positioned on the top center of the stand unit and rotatably receives the bottom surface of a bushing integrated into the stand-display interface. A boss projecting from the bottom center of the recess having two diametrically-opposite wing projections may be used to engage the display unit. Two protrusions used to stop the rotation of the monitor can be positioned on the bottom surface of the recess diametrically opposed to each other. Located in the center of the bottom surface of the stand-display interface is a coupling hole that engages the winged boss. The diametrically opposite wing projections hold the stand-display interface, and thus the monitor, onto the stand.

However, I have observed that the LCD monitor that incorporates a stand using this sort of swiveling device can become unstably supported due to the concentrated force that is exerted on the wing projections because of the center of gravity of the monitor exerting an eccentric load force on the stand when the monitor is tilted. I believe that this causes excessive wear of the wing projections and can lead to the wing projections being overloaded and deforming. This also results in the reduction of the monitors lifespan and a corresponding reduction in the monitor's market competitiveness. I expect that a monitor that more evenly distributes eccentric forces created by the tilting of the monitor will have an extended lifespan resulting in increased consumer satisfaction and an increase in office productivity.

SUMMARY OF THE INVENTION

Accordingly, it is an object of the present invention to provide an improved monitor stand.

It is another object to provide an improved swiveling device for a monitor stand that distributes eccentrically applied forces along the stand-display interface.

It is still another object to provide a monitor with an extended lifespan.

To achieve these and other objects, a swiveling device for liquid crystal display monitors may be constructed using a LCD display unit, a stand unit supporting the display unit, a plurality of connectors for both the power and signal cables, and a stand-display interface that secures the display unit to the stand unit while allowing the display unit to rotate and tilt. The stand unit improves the distribution of force imparted by the weight of the display unit. This prevents the connectors from being subjected to a concentrated force whenever the monitor is tilted toward a user creating an eccentric force and also prevents the connectors from deforming or breaking. These improvements are achieved by using a swiveling device that distributes force along both the stand unit and the stand-display interface. The preferred embodiment uses two curved shoulder ribs positioned symmetrically along the inside wall of the recess and two curved flanges positioned along the outside edge of the bushing of the stand-display interface. Two gaps are formed between the two flanges allowing the shoulder ribs to contact the bottom of the recess. After the shoulder ribs have been inserted past the gaps, the stand-display interface can rotate and cause the flanges to engage the shoulder ribs. With the flanges engaged, eccentric forces created by the display unit's center of gravity are evenly distributed.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
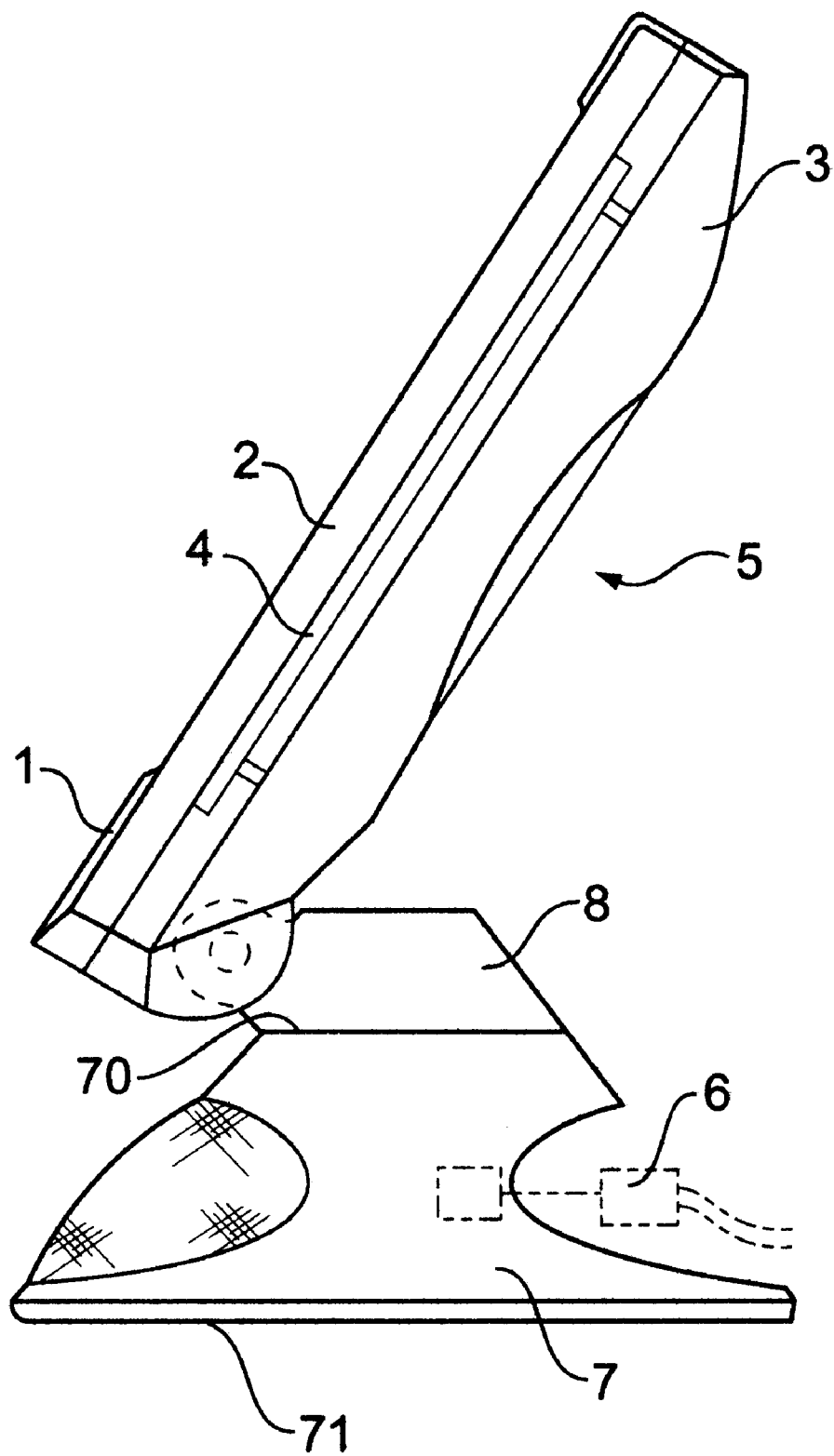
FIG. 1 is a side view showing the construction of a LCD monitor.

Turning now to the drawings, FIG. 1 illustrates a LCD monitor that may be constructed using a LCD display unit 5, stand unit 7 and stand-display interface 8. Front and rear housings 1 and 3 are assembled into a single housing containing both LCD 2 and PCB (Printed Circuit Board) 4.

Stand unit 7 supports display unit 5 on support surface 70 and also supplies connectors (not shown) for both the power and signal cables. Stand-display interface 8 is rotatably held on the top of stand unit 7 at surface 70 by a swiveling device (not shown). The stand-display interface is also hinged to the rear housing 3 of the display unit 5 using a pivot assembly (not shown). This allows the display unit 5 to be tilted upward or downward in relation to base 71 of stand unit 7.

Figure 2:
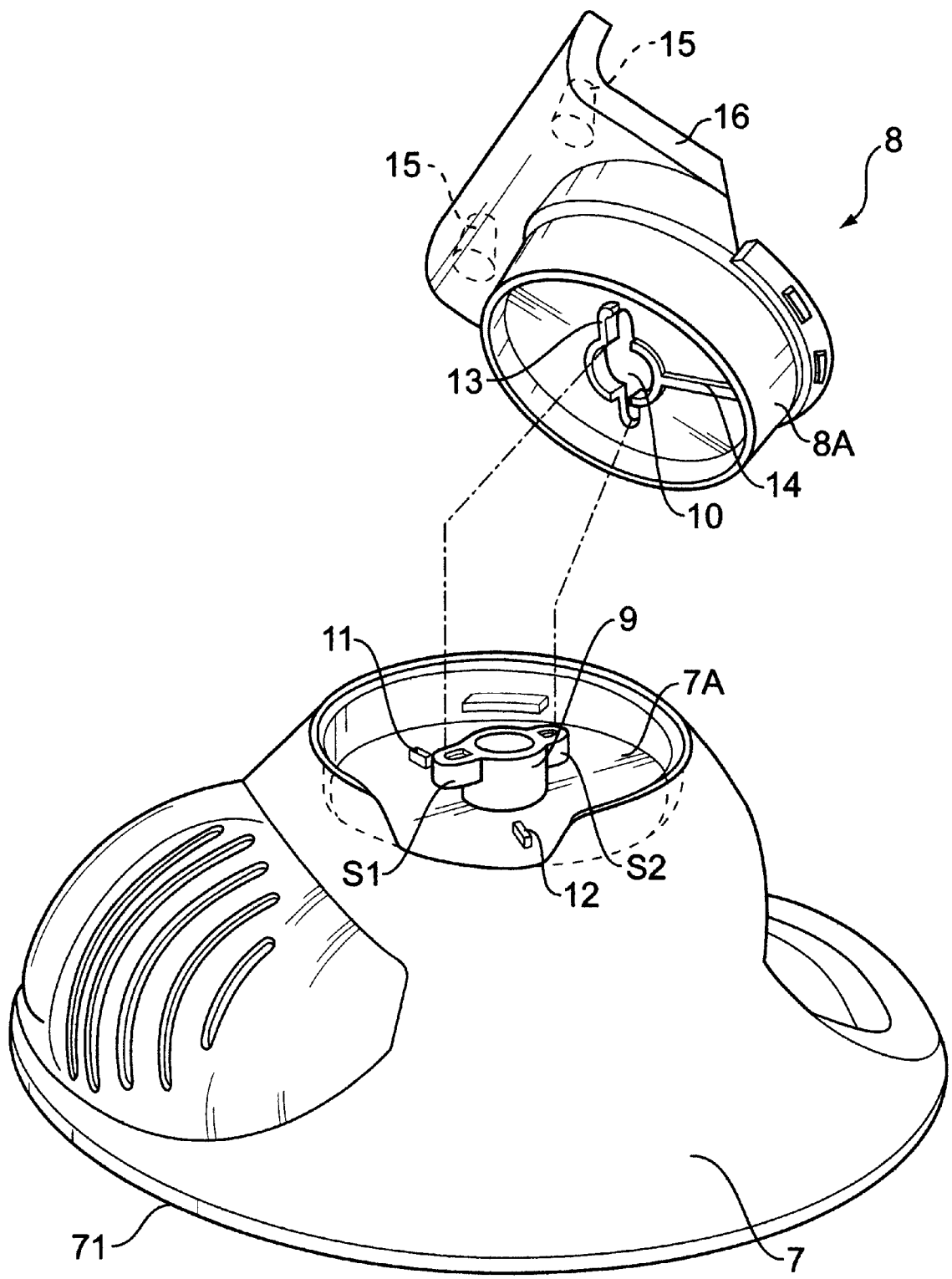
FIG. 2 is an exploded perspective view showing the construction of a swiveling device for monitor stands.

The construction of a swiveling device for LCD monitors is shown in FIG. 2. Stand 7 has recess 7a located in the center of its upper surface. The swiveling device may be constructed using recess 7A and the bottom of bushing 8A on stand-display interface 8. Boss 9 is formed on the bottom center of recess 7A and has two diametrically-opposite wing projections S1 and S2. Two stoppers consisting of members 11 and 12 are positioned along the bottom surface of recess 7A in diametric opposition to each other. The two stoppers are also oriented to create 90° angles with the two wing projections S1 and S2. Coupling hole 10 is located in the bottom center of stand-display interface 8. Coupling hole 10 has a shape that allows winged boss 9 to be inserted into the hole. Radial stoppers 13 and 14 are positioned on the bottom surface of stand-display interface 8 to limit the horizontal rotation of stand-display interface 8 on stand unit 7 to an angle of about 45°. Plurality of bosses 15 are attached to stand-display interface 8 to secure display unit 5. Cover 16 can be detachably snapped into stand-display interface 8.

When a heavy LCD display unit is tilted so that its weight creates an eccentrically loaded force on stand unit 7, the display unit becomes unstably supported by the stand unit. The bottom surface of the stand-display interface is restrained by the boss's wing projections S1 and S2 and thus, secure the monitor to the stand. This causes the eccentric force created by a heavy display unit to be concentrated onto the wing projections and eventually the force overloads the wing projections. When the wing projections are overloaded they deform or break causing the monitor to be unusable and possibly damaging the display unit when it falls. Thus, the lifespan of monitors using this swiveling device is shortened and the corresponding market competitiveness of the monitors is reduced.

Figure 3:
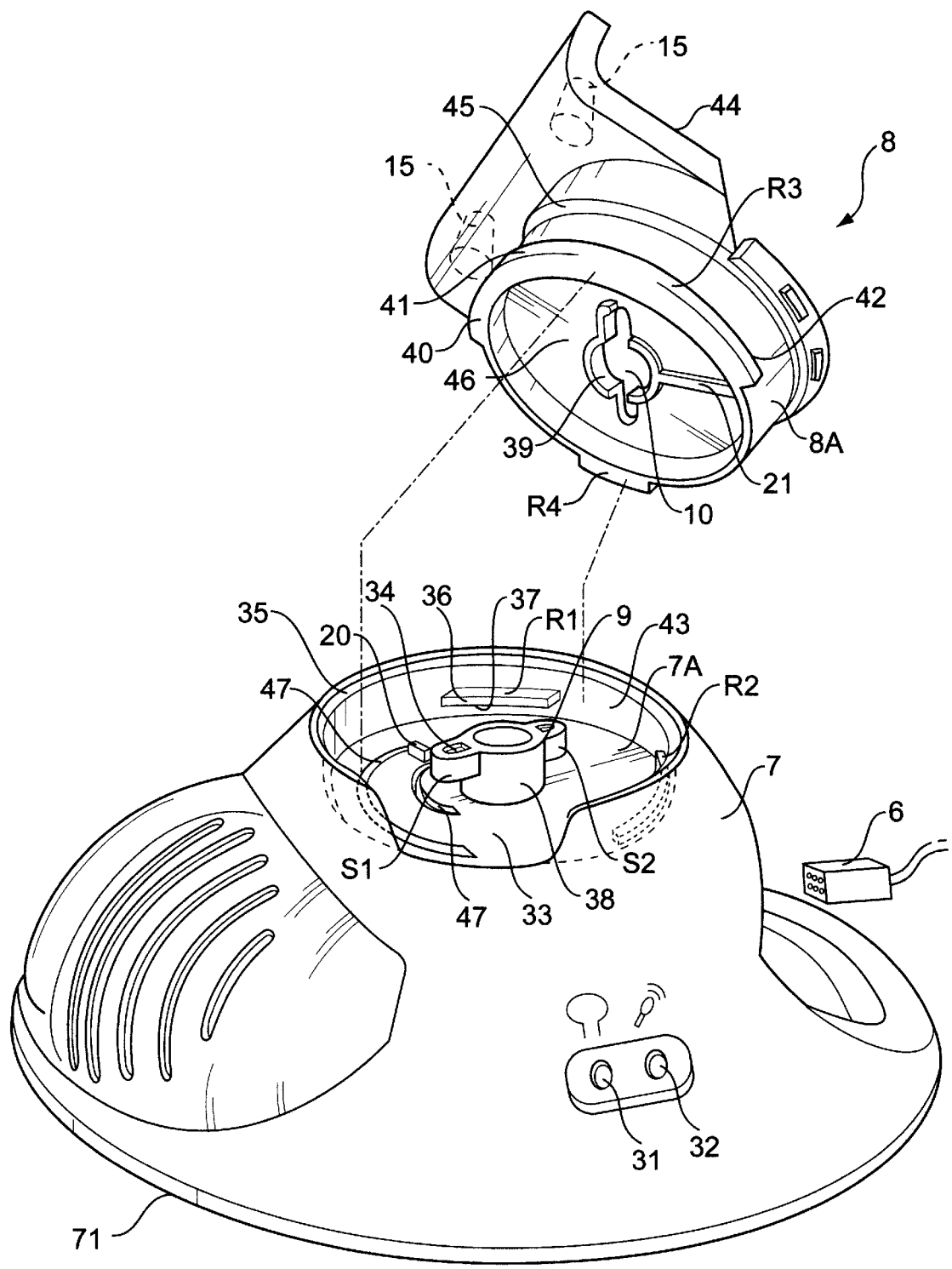
FIG. 3 is an exploded perspective view showing the construction of a swiveling device for monitor stands as constructed according to the principles of the present invention.
Figure 4A:
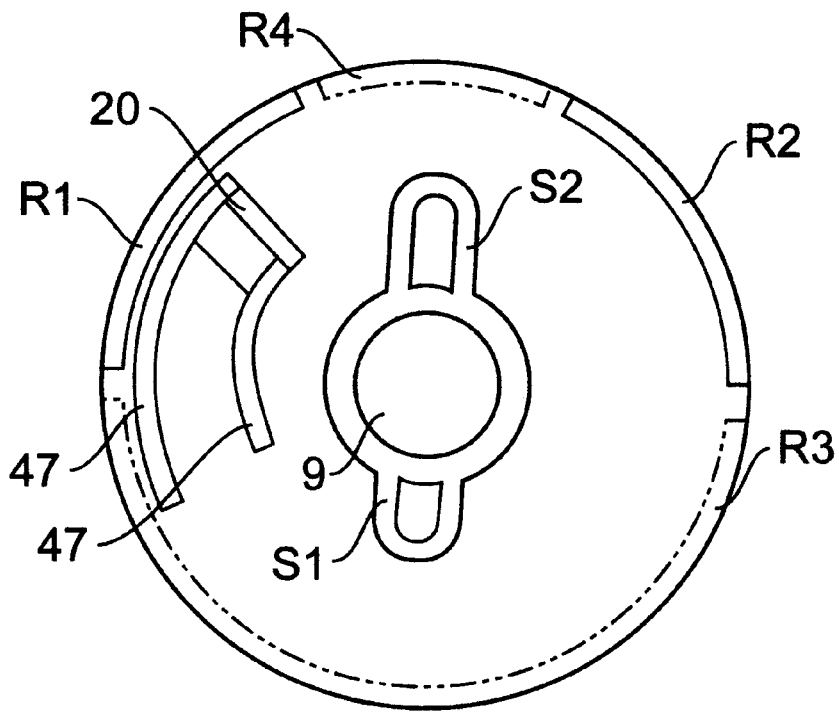
FIG. 4A is a top view of a recess in the stand unit showing the necessary alignment of the flanges for the stand-display interface to engage the stand.
Figure 4B:
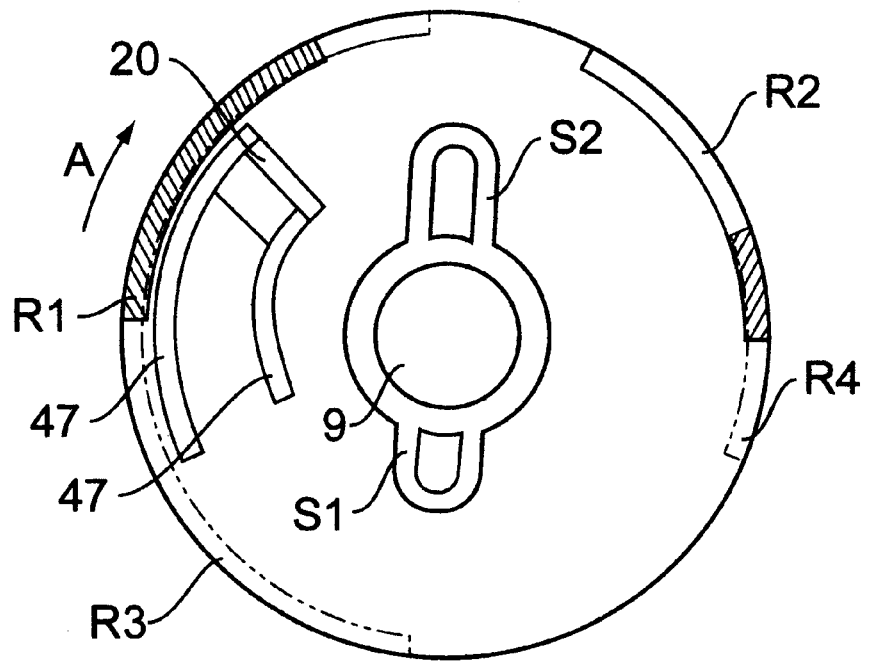
FIG. 4B is a top view of a recess in the stand unit showing the position of the flanges rotated 90 degrees after they were first inserted past the gaps created by the positioning of the shoulder ribs.
Figure 4C:
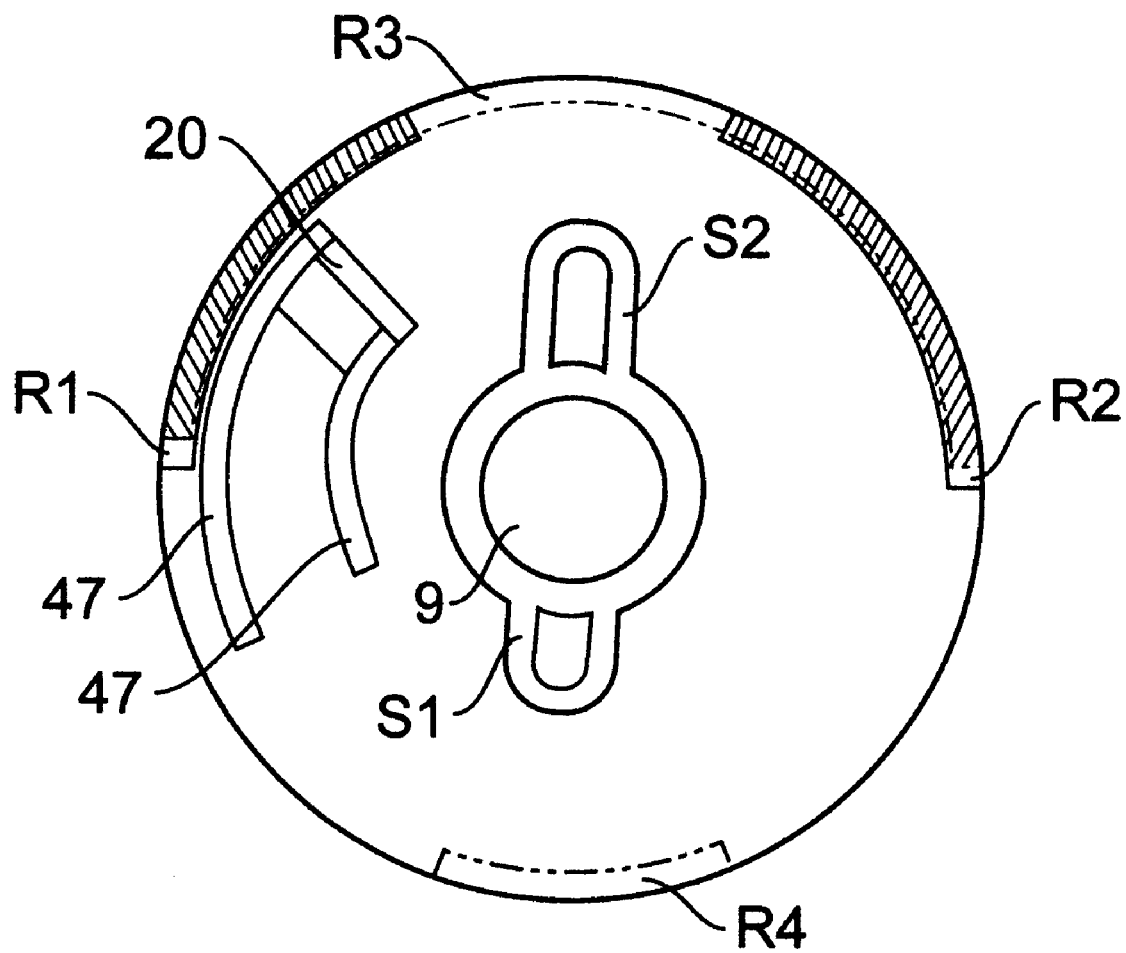
FIG. 4C is a top view of a recess in the stand unit showing another possible position of the flanges after they were first inserted past the gaps created by the positioning of the shoulder ribs.

FIG. 3 shows the construction of an improved swiveling device for LCD monitors as constructed according to the principles of the present invention. FIGS. 4A through 4C show the operation of the swiveling device. A monitor constructed using the improved swiveling device may be constructed using a LCD display unit (not shown), both front and rear housings (not shown) that combine to form a single housing containing both a LCD (not shown) and a PCB (not shown). The monitor is connected to a plurality of connectors is mounted on the seating surface or top side 44 of interface device 8. Lip 45 of stand-display interface or interface device, 8 contacts a circumferential surface 35 located around an edge of hollow 7A in stand unit 7 having a base. Stand unit 7 supports a plurality of connectors for power and signal cables 6 along with headphone jack 31 and microphone jack 32. Display unit 5 is secured on stand unit or stand or first portion, 7 by stand-display interface 8 that allows the display unit to be both rotated and tilted. A pivot assembly hinges the display unit to stand-display interface 8 allowing the display unit 5 to be tiltable upward or downward and the swiveling device allows the display unit to be rotatable along a horizontal plane.

When the display unit is tilted so that its center of gravity creates an eccentric force on the stand unit, the construction of the improved swiveling device allows the force to be evenly distributed. The swiveling device of this invention distributes the weight of the display unit, thus preventing the force from being concentrated on wing projections also referred to in the claims as at least one projection or two diametrically opposed projections, S1 and S2. Recess 7A is positioned on the top center of stand unit 7. Boss 9 is located in the center of the bottom 33 of recess hollow or recess 7A and has two integrally formed wing projections S1 and S2. A projecting member or first beam 20 is positioned along surface 33 of hollow 7A, in an orientation creating 90° angles between the stopping first beam and wing projections S1 and S2, to prevent rotation exceeding 360°. The winged projections may have perforating 34. Plurality of ribbed protrusions R1 and R2 are attached on inner surface 43 of hollow 7A to further distribute eccentric forces applied to the stand unit. The two ribs R1 and R2 may have the same length and are symmetrically positioned on inner surface 43 of recess 7A in stand unit 7.

Stand-display interface or interface 8 along with attached bushing 8A is rotatably seated in hollow 7A. Two flanges also referred to in the claims as a plurality of flanges, R3 and R4 have different lengths and are positioned along the outside edge of the bushing 8A creating two gaps between the flanges. These gaps allow flanges R3 and R4 to be inserted past the two shoulder ribs R1 and R2. Each of ribs R1 and R2 is preferably positioned at a height sufficient to form a narrow channel or plurality of channels, that can sidably accommodate either flange R3 or R4 without allowing either flange to move in a direction vertical to surface 33 of the hollow or recess. Once surface 40 of the interface device and surface 33 of hollow 7A are in contact the stand-display interface also referred to in the claims as an interface device, can be rotated to engage surface 42 of flanges R3 and R4 with surface 37 of ribs R1 and R2. The slidable engagement of ribs R1 and R2 with the flanges R3 and R4 distributes the eccentric force created by the weight of the display unit and prevents the force from being concentrated onto wing projections S1 and S2 of boss 9. Bore, or coupling hole, 10 is located in the center of surface 46 in stand-display interface 8 and has a shape allowing boss 9 and wing projections S1 and S2 to be inserted through the hole. When boss 9, which may have a hollow interior, is inserted through bore 10, outer surface 38 of the boss slidably contacts inner surface 39 of bore 10. Radial stopper also referred to in the claims as a second beam, 21 is positioned on surface 46 of the stand-display interface to contact projecting member 20 and limit the horizontal rotation of interface device 8 to a little less than 360°. A plurality of semi circumferential ridges 47 are positioned along the bottom of the recess in the stand unit to act as a gentle brake on the rotation of stand-display interface 8. As such, the improved swiveling device allows for greater rotation and smoother braking of the attached display unit.

The swiveling device constructed according to the principles of the present invention also prevents the overloading of wing projections S1 and S2. Bottom side surface 40 of bushing 8A of stand-display interface 8 is rotatably seated in contact with surface 33 of hollow 7A because of the interaction between the stand-display interface and the recess. Surface 37 of shoulder ribs R1 and R2 is in slidable contact with surface 42 of flanges R3 and R4. While the flanges slide in the channel formed between surface 37 of flanges R1 and R2 and surface 33 in recess 7A, surface 36 of both ribs is in contact with bushing 8A, and surface 41 on the flanges is in contact with surface 43 in the recession. Thus, the distribution of force due to the contact between shoulder ribs, R1 and R2 and flanges R3 and R4 effectively supports the display unit while preventing the concentration of force onto wing projections S1 and S2 of boss 9.

To move flanges R3 and R4 into slidable engagement with ribs R1 and R2, bushing 8A of stand-display interface 8 is inserted into recess 7A of stand unit 7. FIG. 4A shows the alignment required of flanges R3 and R4 to pass through the gaps between shoulder ribs R1 and R2. After inserting the flanges past the shoulder ribs, the stand-display interface should be rotated 90° in the direction denoted 'A' in FIG. 4B. In this position, surface 40 of flanges R3 and R4 is prevented from losing contact with surface 33 of the recess. Surface 37 of shoulder ribs R1 and R2 is in slidable contact with surface 42 of flanges R3 and R4 booking shoulder ribs R1 and R2. This contact distributes the load due to an eccentric force on the stand.

FIG. 4C shows another alignment the flanges R3 and R4 can be in relative to the shoulder ribs R1 and R2 after the flanges have been inserted past the shoulder ribs. In the alignment shown in FIG. 4C, flange R3 of the stand-display interface 8 is in slidable contact with both ribs R1 and R2 of stand unit 7 and flange R4 is not in contact with either rib. The areas where the ribs are in contact with the flanges is shown by shading in both FIGS. 4B and 4C.

Thus, when display unit 5 is tilted towards the base of the stand unit, the display unit's center of gravity creates an eccentric force on the stand. However, due to ribs R1 and R2 slidably engaging flange R3 this eccentric force is distributed over the stand rather than being concentrated onto wing projections S1 and S2 of boss 9. This increases the reliability and the corresponding market competitiveness of monitors using, this improved swiveling device, as well as preventing inefficiencies created by a monitor failure in the work place.

Although this preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A display device having a housing containing a monitor, said display device further comprising:
   a stand having a base, said stand further comprising:
   a hollow positioned opposite from said base and having a cylindrical shape;
   a plurality of semi-circumferential riddles along a bottom of said hollow;
   a plurality of ribbed protrusions positioned inside said hollow and parallel to said base;
   said plurality of ribbed protrusions being two symmetrically positioned ribbed protrusions of equal length and forming a plurality of channels between said plurality of ribbed protrusions and said bottom of said hollow;
   a boss attached to said bottom of said hollow having a tubular shape, an open interior, and two diametrically opposed projections located at distal ends opposite to said bottom of said hollow and each having a perforation in a direction perpendicular to said base;
   a plurality of power and signal cables enabling said monitor to receive a power supply input and a plurality of signal inputs, said plurality of power and signal cables further producing a plurality of video and audio outputs corresponding to said plurality of signal inputs;
   a plurality of connector jacks for pairs of headphones and a microphone, and
   a first beam radially attached along said bottom of said hollow;

an interface device rotatably securable through at least 320 degrees in said hollow of said stand having a cylindrical shape and a top side and a bottom side, said interface device further comprising:
   a plurality of flanges extending outwardly along said bottom side of said interface device and slidably engaging said plurality of channels in said hollow of said stand upon said interface device being inserted into said hollow;
   a bore having a circular opening located in a center of said bottom side of said interface device;
   a plurality of connectors attached to said top side of said interface device connectable attaching said housing containing said monitor to said interface device; and
   a second beam radially attached along said bottom side;
said boss of said stand penetrating said bore of said interface device when said interface device is inserted into said hollow of said stand;
said plurality of semi-circumferential ridges of said stand contacting said second beam of said interface device to provide a retarding force on a rotation of said interface device; and
said first beam of said stand contactable with said second beam to prevent rotation of said interface device beyond said at least 320 degrees in said hollow of said stand.

2. The display device of claim 1, further comprised of said plurality of flanges being two flanges of different lengths positioned to allow insertion past said ribbed protrusions.

3. The display device of claim 1, wherein said interface device comprises a bushing that slidably engages said plurality of flanges with said plurality of ribbed protrusions in said hollow of said stand.

4. The interface device of claim 3, wherein said interface device is rotated at least 70° after engaging said plurality of flanges with said plurality of ribbed protrusions.

5. The interface device of claim 3, wherein said interface device is rotated after engaging said plurality of flanges with said plurality of ribbed protrusions such that a single flange engages said plurality of ribbed protrusions.

6. A stand supporting a housing containing a monitor, said stand further comprising:
   a first portion having a base, said first portion further comprising:
   a hollow positioned opposite from said base and having a cylindrical shape;
   a plurality of semi-circumferential ridges along a bottom of said hollow;
   a plurality of ribbed protrusions positioned inside said hollow and parallel to said base;
   said plurality of ribbed protrusions being two symmetrically positioned ribbed protrusions of equal length and forming a plurality of channels between said plurality of ribbed protrusions and said bottom of said hollow;
   a boss attached to said bottom of said hollow having a tubular shape, an open interior, and two diametrically opposed projections located at distal ends opposite to said bottom of said hollow and each having a perforation in a direction perpendicular to said base;
   a plurality of power and signal cables causing said monitor to receive a power supply input and a plurality of signal inputs said plurality of power and signal cables further producing a plurality of video and audio outputs corresponding to said plurality of signal inputs; and a first beam radially attached along said bottom of said hollow;

an interface device rotatably securable through at least 320 degrees in said hollow of said first portion having a cylindrical shape and a top side and a bottom side, said interface device further comprising:
- a plurality of flanges extending outwardly along said bottom side of said interface device and slidably engaging said plurality of channels in said hollow of said first portion upon said interface device being inserted into said hollow;
- a bore having a circular opening located in a center of said bottom side of said interface device;
- a plurality of connectors attached to said top side of said interface device connectably attaching said housing containing said monitor to said interface device; and
- a second beam radially attached along said bottom side;

said boss of said first portion penetrating said bore of said interface device when said interface device is inserted into said hollow of said first portion;

said plurality of semi-circumferential ridges of said first portion contacting said second beam of said interface device to provide a retarding force on a rotation of said interface device; and said first beam of said first portion contactable with said second beam to prevent rotation of said interface device beyond said at least 320 degrees in said hollow of said first portion.

7. The stand of claim 6, further comprised of said plurality of flanges being two flanges of different lengths positioned to allow insertion past said plurality of ribbed protrusions.

8. The display device of claim 7, wherein said interface device comprises a bushing that slidably engages said plurality of flanges with said plurality of ribbed protrusions in said hollow of said stand.

9. The interface device of claim 8, wherein said interface device is rotated at least 70° after engaging said plurality of flanges with said plurality of ribbed protrusions.

10. The interface device of claim 8, wherein said interface device is rotated after engaging said plurality of flanges with said plurality of ribbed protrusions such that a single flange engages said plurality of ribbed protrusions.

11. A swiveling device supporting a housing containing a monitor, said swiveling device further comprising:
- a first body having a base, said first body further comprising:
  - a hollow positioned opposite from said base and having a cylindrical shape;
  - a plurality of semi-circumferential ridges along a bottom of said hollow;
  - a plurality of ribbed protrusions positioned inside said hollow;
  - said plurality of ribbed protrusions being two symmetrically positioned ribbed protrusions of equal length and forming a plurality of channels between said plurality of ribbed protrusions and said bottom of said hollow;
  - a boss attached to said bottom of said hollow having a tubular shape, an open interior, and two diametrically opposed projections located at distal ends opposite to said bottom of said hollow and each having a perforation in a direction perpendicular to said base;
  - a plurality of power and signal cables causing said monitor to receive a power supply input and a plurality of signal inputs, said plurality of power and signal cables further producing a plurality of video and audio outputs corresponding to said plurality of signal inputs; and
  - a first beam radially attached along said bottom of said hollow;

an interface device rotatably securable through at least 320 degrees in said hollow of said first body having a cylindrical shape and a top side and a bottom side, said interface device further comprising:
- a plurality of flanges extending outwardly along said bottom side of said interface device and slidably engaging said plurality of channels in said hollow of said first body upon said interface device being inserted into said hollow;
- a bore having a circular opening located in a center of said bottom side of said interface device;
- a plurality of connectors attached to said top side of said interface device connectable attaching said housing containing said monitor to said interface device; and
- a second beam radially attached along said bottom side;

said boss of said first body penetrating said bore of said interface device when said interface device is inserted into said hollow of said first body;

said plurality of semi-circumferential ridges of said first body contacting said second beam of said interface device to provide a retarding force on a rotation of said interface device; and said first beam of said first body contactable with said second beam to prevent rotation of said interface device beyond said at least 320 degrees in said hollow of said first body.

12. The display device of claim 11, wherein said interface device comprises a bushing that slidably engages said plurality of flanges with said plurality of ribbed protrusions in said hollow of said stand.

13. The interface device of claim 12, wherein said interface device is rotated at least 70° after engaging said plurality of flanges with said plurality of ribbed protrusions.

14. The interface device of claim 12, wherein said interface device is rotated after engaging said plurality of flanges with said plurality of ribbed protrusions such that a single flange engages said plurality of ribbed protrusions.

* * * * *